United States Patent [19] [11] 4,285,060
Cobb et al. [45] Aug. 18, 1981

[54] SPREAD SPECTRUM CODE TRACKING LOOP

[75] Inventors: Raymond F. Cobb, Melbourne Beach; M. Guy Pelchat, Indialantic, both of Fla.

[73] Assignee: Harris Corporation, Cleveland, Ohio

[21] Appl. No.: 882,069

[22] Filed: Feb. 28, 1978

[51] Int. Cl.³ .............................................. H04B 15/10
[52] U.S. Cl. ........................................ 375/1; 375/120; 455/304
[58] Field of Search ...................... 325/30, 32, 65, 474, 325/475, 476, 44, 58, 419, 442, 324, 346; 329/120, 124; 375/1, 58, 83, 120; 455/304

[56] References Cited

U.S. PATENT DOCUMENTS

| | | | |
|---|---|---|---|
| 3,646,446 | 2/1972 | Rittenbach | 325/346 |
| 3,745,255 | 7/1973 | Fletcher | 325/419 |
| 4,017,798 | 4/1977 | Gordy | 325/30 |
| 4,038,540 | 7/1977 | Roberts | 329/124 |
| 4,041,391 | 8/1977 | Deerkowski | 325/65 |
| 4,053,834 | 10/1977 | Lerner | 325/65 |
| 4,123,718 | 10/1978 | Lampert et al. | 325/65 |

*Primary Examiner*—Howard A. Birmiel
*Attorney, Agent, or Firm*—Craig and Antonelli

[57] ABSTRACT

A code tracking loop for a spread spectrum receiver includes a pair of mixer circuits to which phase offset or relatively delayed pseudo noise code signals are applied and combined with an incoming IF spread spectrum signal. The output of the mixers are coupled to a sum and difference hybrid. The hybrid produces a sum signal corresponding to the sum of the mixer outputs and a difference signal corresponding to the difference between the mixer outputs. These sum and difference signals are separately filtered, amplified and then coupled to a further mixer or phase detector. Appropriate AGC circuitry is controlled by the envelope of the sum signal to adjust the gains of the respective amplifiers. The output of the phase detector is proportional to the difference between the squares of the outputs of the hybrid and represents the phase of the sum signal relative to the difference signal. This phase-representative signal is coupled through a tracking loop filter to control the voltage controlled clock for the local PN code generator. A significant advantage of the inventive system is that even if the gains of the separate channels are not equal, this gain difference does not erroneously affect the output of the phase detector.

15 Claims, 7 Drawing Figures

SPREAD SPECTRUM CODE TRACKING LOOP

The U.S. Government has rights in this invention pursuant to Contract No. DAAB07-75-C-0040 awarded by the Department of the Army.

FIELD OF THE INVENTION

The present invention relates to spread spectrum communication systems and is particularly directed to a technique and a system for controlling the timing of a pseudo-noise sequence, locally generated at the receiver, with which an incoming spread spectrum information signal is correlated.

BACKGROUND OF THE INVENTION

In a spread spectrum communication system, wherein transmitted signal power is spread over a transmission bandwidth many times greater than the information bandwidth, signal power is sacrificed in an effort to achieve jam resistance, reduce the probability of detection, and to provide multipath signal rejection. Typically, spread spectrum communication systems employ a pair of pseudo-noise (PN) sequence generators at the transmitting and receiving stations, to respectively control the modulation and demodulation of the phase of the carrier signal. At the transmitter, a PN bit sequence may be encoded to produce a wide band signal which is combined with a relatively narrow bandwidth digital data signal so as to form modulation signals. The modulation signals may be applied to a multiphase (e.g. quad phase) modulator through which the carrier signal is phase shift keyed (PSK) modulated, to thereby obtain a spread spectrum signal having a wide bandwidth over which the power density is thinly spread. FIG. 1a shows an exemplary spectrum characteristic of a PSK signal, the transmitted signal power of which is confined to a prescribed frequency, while FIG. 1b depicts an exemplary spectrum characteristic of a PSK signal, the transmitted signal power of which is spread over a fairly large bandwidth as a result of subjecting the original PSK signal to spread spectrum transmission. FIG. 1c illustrates the spectrum characteristic of a spread spectrum transmitted PSK signal as shown in FIG. 1b in the presence of a jamming signal occupying some fixed or narrow bandwidth region of the spectrum. As will be readily appreciated from a comparison of FIGS. 1a through 1c, whereas the presence of a jamming signal having a frequency which corresponds to that of a transmitted non-spread PSK signal would effectively prevent intelligent detection of the non-spread PSK signal, such a jamming signal does not prevent acquisition of a spread spectrum PSK signal because the information contained in the signal is spread out over a large number of frequencies exclusive of that of the jamming signal.

To recover the original narrow bandwidth data signal from a transmitted spread spectrum signal, the receiver correlates a PN sequence or code with the incoming spread spectrum signal. This PN code generated at the output of the PN sequence generator at the receiver matches or is identical to the PN sequence employed at the transmitter for the modulation of the phase of the carrier signal, so that when the PN sequence generated at the receiver is synchronized with the PN sequence contained in the received spread spectrum signal, correlation of the two signals will enable demodulation and data recovery to be achieved.

For the purpose of synchronizing the PN sequence generated at the receiver with that contained in the incoming spread spectrum signal, timing control circuitry is provided in the receiver which controls the clock rate and generation of the receiver's PN code in an effort to maintain full correlation between the two PN sequences. The degree of synchronization must be such that the local PN code falls within ±1 baud period of the PN code contained in the received spread spectrum signal.

FIG. 2 illustrates the power distribution characteristics for the correlation of a pair of PN codes so employed in a spread spectrum communication system. As can be seen from FIG. 2, the power contained within the correlation of the PN codes is at a maximum when the codes are exactly in phase and decreases substantially as the phase difference or time differential between the PN code generated at the receiver and that contained in the receiver spread spectrum signal shifts towards ±1 baud period. Outside the ±1 baud period time differential there is effectively no useful correlation between the two PN codes, so that it is of paramount inportance that precise synchronization between the two codes be maintained in order that data recovery can be achieved.

One approach to synchronizing the two codes, referred to as the "dither" technique, involves a scheme whereby the clock phase by which the locally generated PN sequence is controlled is scanned (retarded or advanced) and the amount of correlation for the two phases (advanced phase and retarded phase) is compared. Namely, the locally generated PN code is "dithered" in time and the difference between the results of the correlations for a pair of advanced and retarded PN codes with the received PN code is used to direct a local oscillator towards a frequency which will correct for phase error between the locally generated and received PN codes. A general description and illustration of a "dithering" technique may be found in U.S. Pat. No. to Gordy et al 4,017,798 and reference may be had thereto for further understanding of such a technique as the case requires. Now, although a "dithering" scheme, as described briefly above and represented, for example, by the system described in the above-cited Gordy et al patent, is fairly simple, since only a single channel is required, it is still subject to jamming. For example, since alternating signal measurements are carried out for the advanced and retarded locally generated PN code, it is possible to introduce noise into, or spoof, the system so as to effectively offset one or more measured values in a sequence and thereby cause an improper shift of the local oscillator. Also, a dithering scheme suffers inherently higher tracking jitter due to noise than does a delay lock loop.

To overcome the problem of spoofing and degraded noise performance, to which a "dithering" scheme is vulnerable, there has been developed a delay lock loop code tracking system, an exemplary configuration of which is illustrated in FIG. 3. In accordance with a delay lock loop scheme, signal measurements are carried out for a pair of channels simultaneously, the phases of the two channels being relatively offset and the locally generated PN code is controlled so as to maintain the relative phase difference between the two channels at a constant value. In the system shown in FIG. 3, an incoming spread spectrum IF signal containing the transmitted PN code with which the locally generated PN code is to be synchronized is distributed from an input terminal 11 to a pair of mixers 12 and 13. In each of mixers 12 and 13, the received signal is combined with a PN signal code locally produced by PN code generator 17, local oscillator 16, and quadphase modulator 15. To provide a relative phase offset between the codes applied to mixers 12 and 13, a delay 14 is inserted in the signal path between the output of quad-phase modulator 15 and mixer 13. The outputs of mixers 12 and 13 are filtered in IF filters 18 and 19 and applied via a pair of variable gain amplifiers 20 and 21 to envelope detectors 24 and 25 respectively. The outputs of envelope detectors 24 and 25 represent the degree of correlation of the PN code contained in the received spread spectrum signal with the pair of relatively offset PN codes generated at the receiver for channels A and B.

FIG. 4 shows a pair of power distribution characteristics, like the one shown in FIG. 2, corresponding to the signal power correlations for channels A and B, respectively, when the system shown in FIG. 3 is properly controlling the timing of the locally generated PN codes and the gains of the channels A and B are equal. More specifically, the clock control input of PN generator 17 is supplied from voltage controlled clock 22, the input of which is coupled to the output of a tracking loop filter 26. The input of tracking loop filter 26 is coupled to the difference output port of a sum and difference circuit 27. The sum output port of sum and difference circuit 27 is coupled through an AGC loop filter to the gain control inputs of variable gain amplifiers 20 and 21. Now, the output of voltage controlled clock 22 is set such that the PN sequence produced at the output of quad-phase modulator 15 leads or is advanced relative to the PN code contained in the signal at terminal 11 by a prescribed time differential $+\Delta T/2$. The delay imparted by delay 14 is equal to a time differential $\Delta T$ so that the PN code appearing at the output of delay 14 lags or is retarded relative to the PN code contained in the signal at terminal 11 by the time differential $-\Delta T/2$. Therefore, for equal gains through the two channels A and B, the outputs of envelope detectors 24 and 25 will be equal when the locally generated PN code inputs to mixers 12 and 13 are equally shifted about the maximum correlation timing position (0) shown in FIG. 4a. Accordingly, with this arrangement, either channel A or channel B may be used for data recovery provided that the correlation loss resulting from the phase shift is tolerable, or a third channel may be coupled to the output of quad-phase modulator 15 through a delay having phase offset of $\Delta T/2$ to provide the proper code phasing for full signal correlation.

Now, compared to the "dithering" technique described previously, for a delay between the two channels equal to the peak-to-peak time dither, the delay lock loop has inherently less tracking jitter than the dithered loop. However, the principal difficulty with the delay lock loop scheme is the need to accurately match the IF gains in the two channels A and B, as a one dB gain mismatch may cause a one-quarter loss in correlation. Namely, although AGC loop filter 23 is employed to control the gain of variable gain amplifier 20 and 21 for the respective channels, the characteristics of the separate channel components may result in a gain mismatch so that, even if the locally generated PN codes are properly timed relative to the PN code contained in the received spread spectrum signal, the outputs of envelope detector 24 and 25 may not be equal, causing a non-zero difference signal to be produced by sum and difference circuit 27, the sign or polarity of which is dependent upon the gains of the two channels A and B, thereby causing an erroneous shift of the output of clock 22 and a resultant mistiming of the PN codes.

SUMMARY OF THE INVENTION

In accordance with the present invention, the jam-immunity properties of a delay lock loop code control system are afforded without being affected by the variable gain characteristics of the separate channels. Rather than process the correlations of the signals in the separate channels so as to obtain a difference signal, the polarity of which depends upon the gains of the separate channels, the improved delay lock loop code tracking scheme of the present invention incorporates signal power measuring circuitry, the output of which has a polarity which is effectively independent of the gains of the separate channels, whereby gain variations for the separate channels, which would cause mistiming of the locally generated PN codes in a conventional delay lock loop configuration, do not influence the code correlation process.

More specifically, applicants have discovered that, because of the nature of the signals being processed and the code synchronization problem with which they were faced, they were able to adapt signal processing components employed in antenna tracking systems to a delay lock loop code synchronization system for a spread spectrum demodulator, and thereby eliminate the gain variation problem inherent in prior art delay lock loop systems, while still taking advantage of the improved anti-jamming features offered by a delay lock loop code synchronization configuration relative to a "dithered" scheme.

For this purpose, in accordance with the present invention, rather than couple the outputs of the code combining mixers through a pair of gain-controlled envelope detection channels to a sum and difference circuit, as described previously with regard to the system shown in FIG. 3, applicants have developed a system wherein the mixer outputs are coupled to a 180° hybrid sum and difference circuit. The hybrid produces a sum signal corresponding to the sum of the mixer outputs and a difference signal corresponding to the difference between the mixer outputs. These sum and difference signals are separately filtered, amplified and then coupled to a further mixer or phase detector. Appropriate AGC circuitry is controlled by the envelope of the sum signal to adjust the gains of the respective amplifiers in an ordinary manner, simply to ensure a useful output through each channel. The output of the phase detector is proportional to the difference between the squares of the outputs of the hybrid and represents the phase of the sum signal relative to the difference signal. This phase-representative signal is coupled through a tracking loop filter to control the voltage controlled clock for the local PN code generator. A significant advantage of the inventive system is that even if the gains of the separate channels are not equal, this gain difference does not erroneously affect the output of the phase detector. Specifically, the output of the phase detector corresponds to the product of a proportionality constant and the difference in the squares of the output of the 180° hybrid, so that a difference in the gains of the two channels derived from the hybrid sum and difference output ports merely changes the proportionality constant but not the difference in the squares of the output ports. Since the direction in which the voltage controlled clock is driven (advanced or retarded) depends only on the sign of the output of the phase detector, control of the timing of the PN codes can be accurately maintained, even if the gains of the separate channels are not equal.

DETAILED DESCRIPTION

Figure 5:
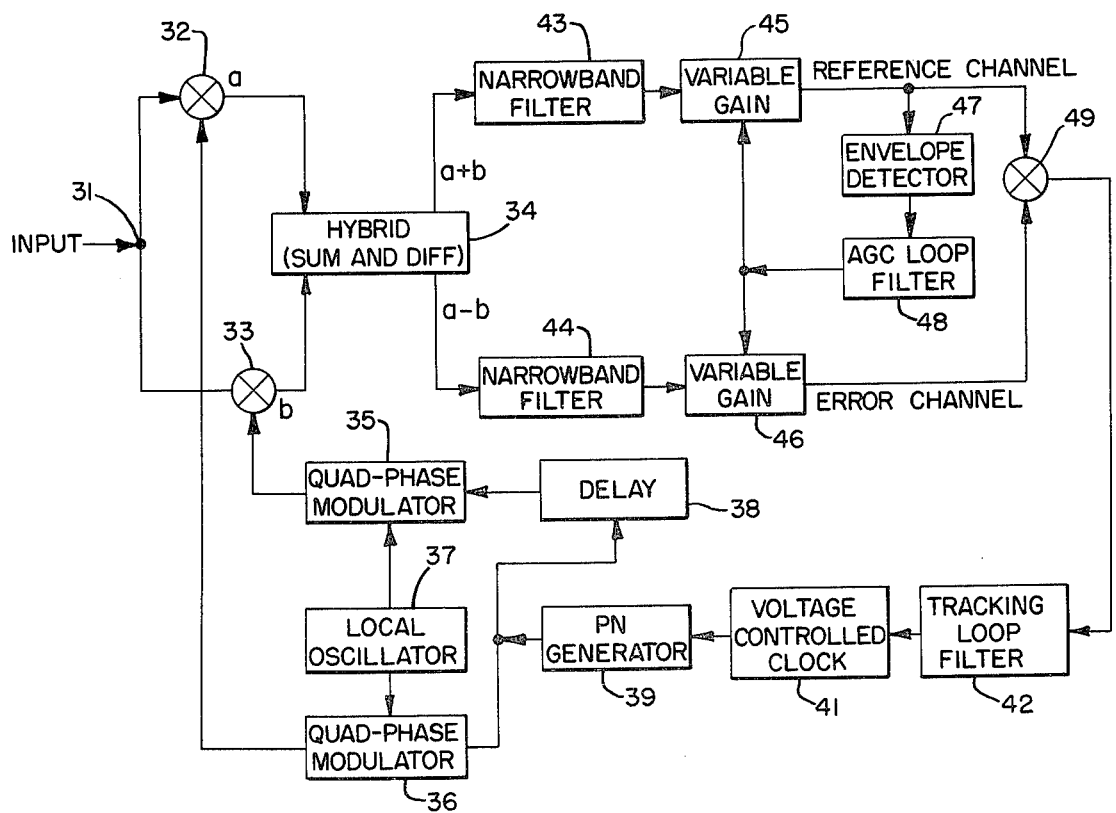
FIG. 5 is a schematic diagram of a PN code timing control system in accordance with the present invention.

Referring to FIG. 5, depicting a schematic block diagram of an improved delay lock loop code timing system in accordance with the present invention, a received spread spectrum IF input signal containing a PN code with which the locally generated code is to be synchronized is distributed from input 31 to respective inputs of mixers 32 and 33. A second input to mixer 32 is coupled to the output of quad-phase modulator 36 and a second input of mixer 33 is coupled to the output of quad-phase modulator 35. Each of modulators 35 and 36 is coupled to a local oscillator 37. Modulator 35 is further coupled via delay 38 to the output of PN generator 39, while modulator 36 is coupled directly to the output of PN generator 39. Modulators 35 and 36 supply respective reference or locally generated PN code signals to be combined in mixers 32 and 33 with a received spread spectrum IF signal. The output of mixer 32 corresponds to the product (a) of a PN code signal produced by modulator 36 and a received spread spectrum signal. The output of mixer 33 corresponds to the product (b) of a PN code signal (delayed with respect to that produced by modulator 36) produced by modulator 35 and a received spread spectrum signal.

The a and b outputs of mixers 32 and 33 are respectively applied to the input ports of a sum and difference hybrid 34, which supplies a sum signal corresponding to the sum of the a and b signals to narrow band filter 43, and a difference signal corresponding to the difference between the a and b signals to narrow band filter 44. The outputs of narrow band filters 43 and 44 are respectively amplified by variable gain amplifiers 45 and 46 and the amplified sum (a+b) and difference (a−b) signals are coupled to mixer or phase detector 49. The output of variable gain amplifier 45 is further coupled to an envelope detector 47, the output of which is filtered in AGC loop filter 48 and coupled to the gain control inputs of variable gain amplifiers 45 and 46. Via envelope detector 47 and AGC loop filter 48 the magnitudes of the sum and difference signals are maintained at appropriate levels for acceptable signal processing. Phase detector 49 produces an output signal proportional to the difference between the squares of the sum and differential signals and supplies this output via a tracking loop filter 42 to voltage controlled clock 41. The output of voltage controlled clock 41 is coupled to PN code generator 39 to control the timing of the locally generated PN sequence.

In operation, a received IF spread spectrum signal is applied to mixers 32 and 33 wherein it is combined with the respective locally generated PN code signals generated by quad-phase modulator 36 and quad-phase modulator 35, respectively. Delay 38 creates a phase offset $\Delta T$ between the otherwise identical outputs of quad-phase modulators 35 and 36. The timing of PN code generator 39 is controlled by clock 41 such that, for a synchronized condition, the PN code signal supplied by modulator 36 leads the PN code contained in the IF spread spectrum signal by $+\Delta T/2$. Thus, due to delay 38, the PN code signal supplied by modulator 35 will lag the PN code contained in the IF spread spectrum signal by $-\Delta T/2$. Accordingly, for in-sync conditions, the difference output (a−b) of hybrid 34 will be zero and the sum output (a+b) will be some finite value. This sum signal (a+b) may be considered as a reference channel for phase detector 49 and the difference signal (a−b) may be considered as the error channel.

As long as the mixer output powers a and b are equal, the error channel component (a−b) will be zero, so that the product of the error and reference channels $a^2-b^2$) will be zero. Therefore, the output of phase detector 49 will be zero and the timing control output of clock 41 remains unaffected. Should there be a displacement or shift of the locally generated PN sequence relative to that contained in the received IF spread spectrum signal, the difference signal a−b will become a quantity other than zero and cause the product $k(a^2-b^2)$ at the output of phase detector 49 to be non-zero. As a result, the clock signal output of clock 41 will be advanced or retarded in accordance with the sign of the output of phase detector 49 to reestablish synchronization.

Figure 1A:
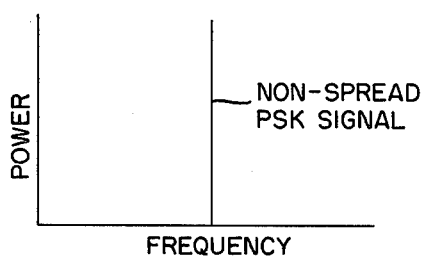
FIGS. 1a through 1c depict spectrum characteristics for a non-spread signal, a spread-spectrum signal, and a spread-spectrum signal in the presence of a jamming signal, respectively.
Figure 1B:
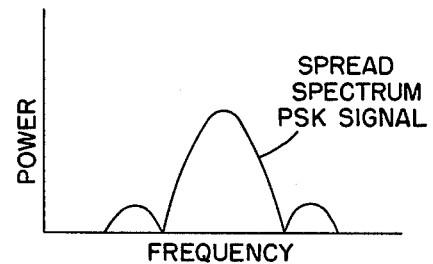
Figure 1C:
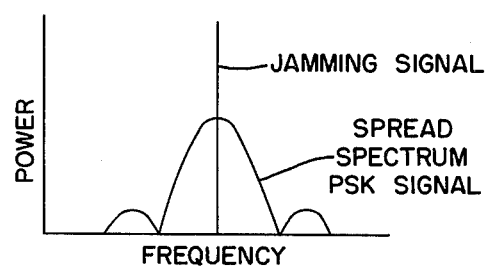
Figure 2:
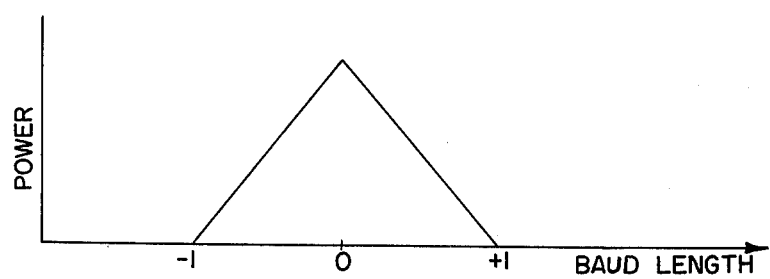
FIGS. 2 and 4 depict diagrams of power distribution correlation curves for the products of PN codes.
Figure 4:
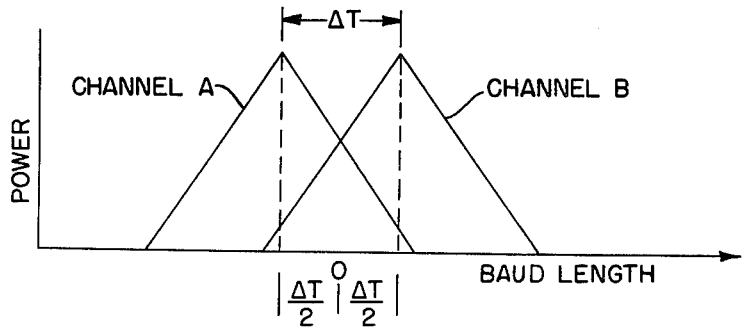
Figure 3:
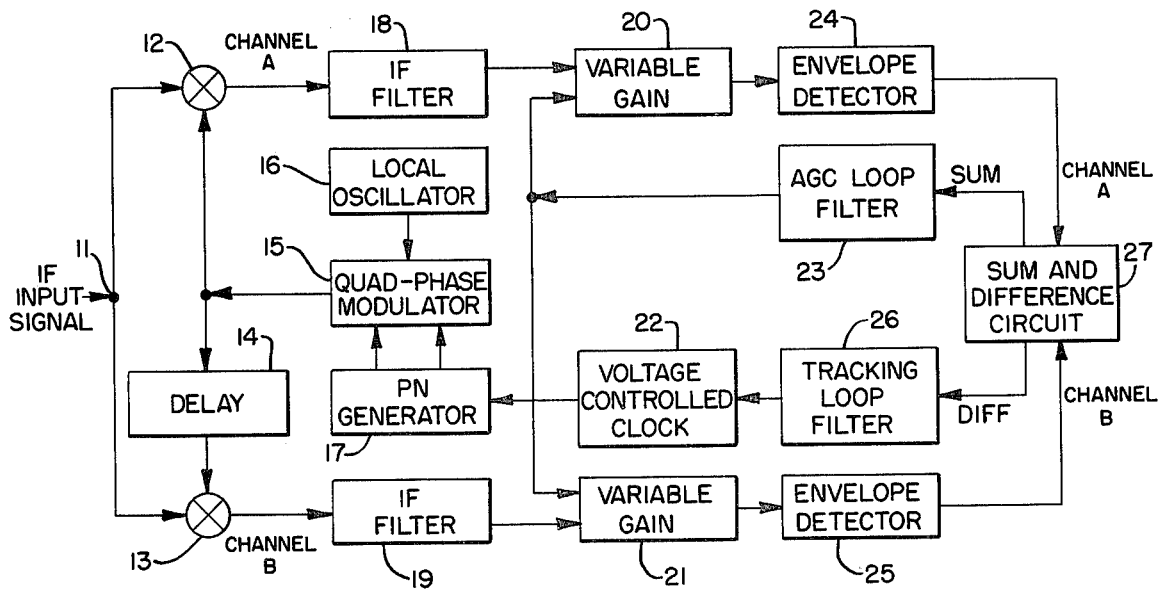
FIG. 3 is a schematic diagram of a conventional delay lock loop PN code timing control system.

As an example, should there be a shift in the timing of the local PN sequence so that the advanced PN sequence a at the output of modulator 36 increases in power (and conversely the delayed PN sequence b at the output of modulator 35 decreases in power) the error channel difference signal (a−b) will be positive so that the output $(a^2-b^2)$ of phase detector 49 will be positive. This positive voltage will cause a shift in the timing of PN generator 39 to bring the two local PN codes back into symmetry about the zero timing position, as shown in FIGS. 2 or 4, and thereby reestablish synchronization.

Of course, for full correlation of the code produced by PN generator 39 with the PN code contained in the incoming spread spectrum signal, a separate channel having a line coupled from terminal 31 to one input of a mixer and a line coupled from modulator 36 through a $\Delta T/2$ delay to the other input of the mixer may be provided. The output of this additional mixer may then be appropriately subjected to the standard demodulation process for data recovery.

As will be appreciated from the foregoing description of the inventive delay lock loop code timing control circuit shown in FIG. 5, since the power measurement circuitry derives a timing control signal the polarity of which depends only on the powers a and b at the input of hybrid 34, gain variations in the respective reference and error channels do not create an erroneous timing control signal at the input of the PN generator's control clock. Since the subtraction of the correlation signals from mixers 32 and 33 is effected via a hybrid 34, the subtraction process can be carried out at a low level, so that no amplifiers, filters, or detectors are used upstream of the hybrid. With the subtraction carried out immediately following despreading (via mixers 32 and 33) only 0°–180° hybrid 34 contributes to loop offsets.

In the foregoing description of an exemplary preferred embodiment of the invention, reference was made to QPSK modulation as one type of modulation for which the invention may be used. It should be noted, however, that the invention is not to be construed as limited to only this type of modulation, but is applicable to communication systems wherein other types of modulation are employed. As one example, the invention may also be used for data recovery schemes for communication systems using binary PSK. Moreover, although in the above-described embodiment of the invention the relatively delayed or temporally-offset PN codes supplied directly at the output of PN generator 39 and at the output of delay 38, respectively, are applied via a modulation scheme (comprising local oscillator 37 and modulators 35 and 36) to mixers 32 and 33, respectively, the modulation scheme may not be absolutely necessary and may be omitted so that the outputs of PN generator 39 and delay 38 may be applied directly to mixers 32 and 33, respectively.

While we have shown and described an embodiment in accordance with the present invention, it is understood that the same is not limited thereto but is susceptible of numerous changes and modifications as known to a person skilled in the art and we therefore do not wish to be limited to the details shown and described herein but intend to cover all such changes and modifications as are obvious to one of ordinary skill in the art.

We claim:

1. A code timing recovery system for a spreadspectrum receiver comprising:
   first means for combining a received spreadspectrum signal containing a transmitted random sequence of pulses with first and second locally generated random sequences of pulses having a prescribed phase difference therebetween, to thereby produce first and second output signals representative of correlations of the random sequence of pulses contained in said received spread-spectrum signal with said first and second locally generated random sequences of pulses, respectively, and
   second means, coupled to said first means, for controlling the timing of said first and second locally generated random sequence of pulses in accordance with the difference between the squares of said first and second output signals.

2. In a code timing recovery system for a spread-spectrum receiver wherein a pair of phase displaced, locally generated random signal sequences are correlated with a random signal sequence contained in a transmitted spread-spectrum signal, to obtain first and second correlation signals, and said first and second correlation signals are coupled through first and second amplifier channels to a signal combining circuit for deriving a control signal by which the timing of said pair of locally generated random signal sequences relative to the random signal sequence contained in the transmitted spread-spectrum signal is controlled,
   the improvement wherein the timing control imparted by said derived control signal is independent of the gains of said first and second amplifier channels.

3. In a code timing recovery system for a spread-spectrum receiver wherein a pair of phase displaced, locally generated random signal sequences are correlated with a random signal sequence contained in a transmitted spread-spectrum signal to obtain first and second correlation signals, and said first and second correlation signals are coupled through first and second amplifier channels and combined to provide a control signal by which the timing of said pair of locally generated random signal sequences relative to the random signal sequence contained in the transmitted spread-spectrum signal is adjusted, the improvement comprising the step of generating said control signal to adjust said timing independent of the gains of said first and second amplifier channels.

4. A code timing recovery system for a spreadspectrum receiver comprising:
   first means for combining a received spreadspectrum signal containing a transmitted random signal sequence with first and second locally generated random signal sequences having a prescribed phase difference therebetween to thereby produce first and second output signals representative of correlations of the random signal sequence contained in said received spread-spectrum signal with said first and second locally generated random signal sequences, respectively,
   second means, coupled to said first means, for generating a pair of third and fourth output signals respectively representative of the sum of and difference between said first and second output signals, respectively,
   third means, coupled to said second means, for combining said third and fourth output signals to produce a fifth output signal; and
   fourth means, coupled to said third means, for controlling the timing of said first and second locally generated random signal sequences in accordance with said fifth output signal.

5. A code timing recovery system according to claim 4, wherein said third means comprises means for producing said fifth output signal in accordance with the product of said third and fourth output signals.

6. A code timing recovery system according to claim 4, further including fifth means, coupled between said second and third means, for respectively amplifying said third and fourth output signals.

7. A code timing recovery system according to claim 5, further including fifth means, coupled between said second and third means, for respectively amplifying said third and fourth output signals.

8. A code timing recovery system according to claim 6, further including sixth means for controlling the amplification of said third and fourth output signals in accordance with said third output signal.

9. A code timing recovery system according to claim 7, further including sixth means for controlling the amplification of said third and fourth output signals in accordance with said third output signal.

10. A method for controlling the timing of a locally generated code in a spread-spectrum receiver comprising the steps of:
   combining a received spread-spectrum signal containing a transmitted random signal sequence with first and second locally generated random signal sequences having a prescribed phase difference therebetween to thereby produce first and second signals representative of correlations of the random signal sequence contained in said received spread-spectrum signal with said first and second locally generated random signal sequences, respectively, generating a pair of third and fourth signals respectively representative of the sum of and difference between said first and second signals, respectively, combining said third and fourth signals to produce a fifth signal; and controlling the timing of said first and second locally generated random signal sequences in accordance with said fifth signal.

11. A method according to claim 10, wherein said combining step comprises producing said fifth signal in accordance with the product of said third and fourth signals.

12. A method according to claim 10, further including the step of respectively amplifying said third and fourth signals.

13. A method according to claim 11, further including the step of respectively amplifying said third and fourth signals.

14. A method according to claim 12, further including the step of controlling the amplification of said third and fourth signals in accordance with said third signal.

15. A method according to claim 13, further including the step of controlling the amplification of said third and fourth signals in accordance with said third signal.

* * * * *